(12) United States Patent
Moens et al.

(10) Patent No.: US 6,995,194 B2
(45) Date of Patent: *Feb. 7, 2006

(54) RADIATION CURABLE POWDER COATING COMPOSITIONS

(75) Inventors: Luc Moens, Sint-Genesius-Rhode (BE); Kris Buysens, Oudenaarde (BE); Daniel Maetens, Brussels (BE)

(73) Assignee: Surface Specialties, S.A., Brussels (BE)

( * ) Notice: Subject to any disclaimer, the term of this patent is extended or adjusted under 35 U.S.C. 154(b) by 47 days.

This patent is subject to a terminal disclaimer.

(21) Appl. No.: 10/484,791

(22) PCT Filed: Jul. 23, 2002

(86) PCT No.: PCT/EP02/08190

§ 371 (c)(1),
(2), (4) Date: Jan. 23, 2004

(87) PCT Pub. No.: WO03/010248

PCT Pub. Date: Feb. 6, 2003

(65) Prior Publication Data

US 2004/0225027 A1  Nov. 11, 2004

(30) Foreign Application Priority Data

Jul. 26, 2001  (EP)  .................. 01118130

(51) Int. Cl.
  *C08F 2/48* (2006.01)
  *B32B 27/06* (2006.01)

(52) U.S. Cl. ............... 522/111; 522/104; 522/109; 522/179; 522/182; 525/165; 525/168; 525/170; 427/512; 427/508; 428/480; 428/482

(58) Field of Classification Search ............... 522/109, 522/110, 111, 112, 104, 179, 182; 525/165, 525/168, 170; 427/512, 508; 428/480, 482
See application file for complete search history.

(56) References Cited

U.S. PATENT DOCUMENTS

| 4,129,488 | A | 12/1978 | McGinniss | |
| 6,380,279 | B1 * | 4/2002 | Moens et al. | ............... 522/111 |
| 6,384,102 | B1 * | 5/2002 | Moens et al. | ............... 522/110 |
| 6,790,876 | B2 * | 9/2004 | Moens et al. | ............... 522/109 |

FOREIGN PATENT DOCUMENTS

| EP | 1 125 996 | 8/2001 |
| WO | 93 19132 | 9/1993 |

OTHER PUBLICATIONS

Chemical Abstracts; vol. 83, No. 22, (1975), Columbus, Ohio, Abstract No. 181208, XP 002187699 & JP 50 072929 (Toray Ind.) (1975), abstract.
Ooka, M., et al.; Chemical Abstracts + Indexes, American Chemical Society, vol. 90, No. 12, Abstract No. 88894m, (1979), XP 002186651..

* cited by examiner

*Primary Examiner*—Sanza L. McClendion
(74) *Attorney, Agent, or Firm*—Wenderoth, Lind & Ponack, L.L.P.

(57) ABSTRACT

A radiation curable powder coating composition is disclosed, which comprises a blend of (meth)acryloyl group containing polyphenoxy resin, a (meth)acryloyl group containing resin other than the polyphenoxy resin and other than a (meth)acryloyl group containing amorphous polyester and, eventually, a (meth)acryloyl group containing monomer or oligomer. These powders give coatings with improved chemical resistance and flexibility.

25 Claims, No Drawings

RADIATION CURABLE POWDER COATING COMPOSITIONS

The present invention concerns powder compositions, hardenable by radiation usable as paint or varnish, comprising a mixture of at least one (meth)acryloyl group containing polyphenoxy resin and at least one (meth)acryloyl group containing resin different from the polyphenoxy resin and from a (meth)acryloyl group containing amorphous polyester, and optionally at least one (meth)acryloyl group containing monomer or oligomer.

The powder compositions of the present invention are especially suited for coating over metal and heat-sensitive substrates and combine, upon melting at low temperatures and curing by radiation, a series of properties such as good flow along with an outstanding solvent resistance and flexibility.

Powder coatings, which are dry, finely divided, free flowing, solid materials at room temperature, have gained considerable popularity in recent years over liquid coatings. Despite their many advantages, nowadays thermosetting powder coatings generally are cured at temperatures of at least 140° C. Below this recommended temperature the coatings have poor appearance as well as poor physical and chemical properties. In consequence of this restriction, powder coatings are generally not employed in coating heat-sensitive substrates such as wood and plastic or assembled metallic parts containing heat-sensitive compounds. Heat-sensitive substrates or compounds both demand low curing temperatures, preferably below 140° C., to avoid significant degradation and/or deformation.

Low temperature radiation curable powders have recently been proposed as a solution to this problem.

The use of unsaturated resins, eventually in combination with unsaturated oligomers, as a binder for radiation curable powder coatings already is subject of a considerable number of patents and patent applications.

UV curable powder coating compositions derived from ethylenically unsaturated group containing polyesters, acrylic copolymers or epoxy resins, among others, already have been extensively illustrated.

U.S. Pat. No. 3,974,303 (Kansai Paint Co Ltd.) describes different unsaturated resins such as methacryloyl group containing polyesters or acrylic copolymers.

DE 2164254 (BASF) describes powder coatings based on unsaturated polyesters, acrylic copolymers, epoxy resins and other polymers containing unsaturated double bonds.

U.S. Pat. No. 4,129,488 (SCM Corporation N.Y.) discloses powder paint coatings suitable for UV curing comprising a specific spatial arrangement of ethylenically unsaturated polymers. The (meth)acrylic unsaturated polymer is a spatial specific epoxy-polyester polymer, produced in a step-wise process, with a number average molecular weight between 1000 and 10 000, providing suitable crystallinity to the free flowing powder and exhibiting a sharp melting point, between 80 and 200° C., for excellent flow.

The powder paints derived from the spatial specific epoxy polyester polymer prove excellent hardness, desirable flexibility and good MEK resistance.

Radiation curable powder coatings, especially developed for those applications where an outstanding flexibility and chemical resistance is needed, all fall short when outdoor durability is concerned.

It now has been surprisingly found that radiation curable powder coating compositions based on a binder comprising a particular mixture of at least one (meth)acryloyl group containing polyphenoxy resin, at least (meth)acryloyl group containing resin, different from the polyphenoxy resin and from a (meth)acryloyl group containing amorphous polyester, and optionally at least one (meth)acryloyl group containing monomer or oligomer, upon application and curing exhibit an excellent combination of flexibility and solvent resistance.

It is accordingly the object of this invention to provide a radiation curable powder coating composition which comprises:

a) 10 to 90% weight of at least one (meth)acryloyl group containing polyphenoxy resin b) 10 to 90% weight of at least one (meth)acryloyl group containing resin, different from the (meth)acryloyl group containing polyphenoxy resin a) and from a (meth)acryloyl group containing amorphous polyester c) 0 to 30% weight of a (meth)acryloyl group containing monomer or oligomer.

The (meth)acryloyl group containing resin b) is selected from semi-crystalline polyester, polyesteramide, polyurethane or polyacrylic copolymer, used alone or in admixture.

The (meth)acryloyl group containing polyphenoxy resin is prepared from the reaction of the glycidyl group of the polyphenoxy resin with:

(meth)acrylic acid the reaction product of an hydroxyalkylester of (meth)acrylic acid such as hydroxyethyl(meth)acrylate with an anhydride such as phthalic anhydride or succinic anhydride.

For the preparation of the (meth)acryloyl group containing polyphenoxy resin, use is generally made of a conventional reactor equipped with a stirrer, an inlet for oxygen, an inlet for the (meth)acryloyl group containing carboxylic acid group containing compound and a thermometer connected to a thermoregulator. To the epoxy resin standing at a temperature between 100 and 150° C., a radical polymerisation inhibitor is added in a proportion of e.g. 0.01 to 1% with respect to the weight of the epoxy resin. A substantial equivalent amount of the (meth)acryloyl group containing carboxylic acid group containing compound is then slowly added to the molten epoxy resin. A catalyst for the acid/epoxy reaction can optionally be used. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). These catalysts are preferably used in an amount of 0.05 to 1% with respect to the weight of the epoxy resin.

The degree of progression of the reaction is monitored by determination of the properties of the ethylenically unsaturated group containing resin obtained, such as acid number, hydroxyl number and the degree of unsaturation.

The (meth)acryloyl group containing polyphenoxy resins incorporated in the compositions in accordance with the present invention, preferably exhibit a degree of unsaturation of 0.2 to 6.0, particularly of 0.5 to 4.5 milliequivalents of double bonds per gram of resin, and in a specifically preferred embodiment additionally exhibit the following characteristics:

a number average molecular weight (Mn) from 450 to 5000, preferably between 650 and 3500, measured by gel permeation chromatography (GPC)

a glass transition temperature (Tg) determined by differential scanning calorimetry (DSC) according to ASTM D3418, from 30 to 80° C.

a viscosity in the molten state measured at 200° C. with a cone/plate viscometer (known under the name of ICI viscosity) according to ASTM D4287, of less than 20 000 mPa.s.

The (meth)acryloyl group containing polyesters of the present invention are semi-crystalline and are prepared from the reaction of a hydroxyl or carboxylic acid functional semi-crystalline polyester with a (meth)acryloyl group containing monomer having functional groups reactable with the functional groups of the polyester.

For the preparation of the hydroxyl or carboxylic acid functional semi-crystalline polyester use is being made of one or more aliphatic, cycloaliphatic or aromatic polyacids and one or more aliphatic or cycloaliphatic polyols. Examples of suitable aliphatic, cycloaliphatic or aromatic acids include among others: phthalic acid, isophthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid, sebacic acid, 1,12-dodecanedioic acid, trimellitic acid, pyromellitic acid and their anhydrides, alone or as a mixture.

Examples of suitable aliphatic or cycloaliphatic polyols include among others: ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-methyl-1,3-propanediol, hydroxypivalate ester of neopentyl glycol, 1,4-cyclohexanediol, 1,4-cyclohexanedimethanol, hydrogenated Bisphenol A, 2,2,4,4-tetramethyl-1,3-cyclobutanediol, 4,8-bis(hydroxymethyl)-tricyclo-[5,2,1,0$^{2,6}$]-decane.

The hydroxyl or carboxylic acid group containing semi-crystalline polyesters of the present invention are prepared according a procedure comprising one or more reaction steps.

On completion of the polycondensation, the hydroxyl or carboxyl functional group containing semi-crystalline polyester in the molten state, which is found in the reactor, is allowed to cool to a temperature between 100 and 160° C., and a radical polymerisation inhibitor, such as phenothiazine or an inhibitor of the hydroquinone type, is added in a proportion of e.g. 0.01 to 1% with respect to the weight of the polyester and the nitrogen is replaced by an oxygen inlet.

When started from a hydroxyl group containing semi-crystalline polyester, a substantially equivalent amount of hydroxyalkyl(meth)acrylate is added thereto. When all the hydroxyalkyl(meth)acrylate is added, an equivalent amount of diisocyanate is slowly added to the mixture. A catalyst for the hydroxyl/isocyanate reaction can optionally be used. Examples of such catalysts include organo-tin compounds (e.g. dibutyltin dilaurate, dibutyltin dimaleate, dibutyltin oxide, stannous octoate, 1,3-diacetoxy-1,1,3,3-tetrabutyl-distanoxane). These catalysts are preferably used in an amount of 0 to 1% with respect to the weight of the polyester.

Otherwise, when started from a semi-crystalline polyester containing carboxyl groups, a substantially equivalent amount of glycidyl(meth)acrylate is added thereto. A catalyst for the acid/epoxy reaction can optionally be used. Examples of such catalysts include amines (e.g. 2-phenylimidazoline), phosphines (e.g. triphenylphosphine), ammonium salts (e.g. tetrabutylammonium bromide or tetrapropylammonium chloride), phosphonium salts (e.g. ethyltriphenylphosphonium bromide or tetrapropylphosphonium chloride). These catalysts are preferably used in an amount of 0.05 to 1% with respect to the weight of the polyester.

The degree of progression of the reaction is monitored by determination of the properties of the semi-crystalline polyester obtained, for example the hydroxyl number, the acid number, the degree of unsaturation and/or the content of free glycidyl(meth)acrylate or hydoxyalkyl(meth)acrylate.

The (meth)acryloyl group containing semi-crystalline polyesters of the present invention are characterised with a number average molecular weight (Mn) from 800 to 16 000 and preferably from 1 300 to 8 500, a melting temperature from 60 to 150° C. and a glass transition temperature of less than 50° C., a degree of unsaturation ranging from 0.15 to 2.00 and preferably from 0.35 to 1.50 milliequivalents of double bonds per gram of polyester and an ICI cone/plate viscosity of less than 50 000 mPa.s measured at 200° C.

The (meth)acryloyl group containing polyesteramides of the present invention are prepared from the reaction of glycidyl(meth)acrylate with a carboxyl group terminated polyesteramide, said polyesteramide being prepared from the reaction of a carboxyl group terminated polyester with a diamine.

The carboxyl group terminated polyesters used for the synthesis of the polyesteramides are prepared from aliphatic, cycloaliphatic or aromatic polyacids used in a mixture or alone, and aliphatic or cycloaliphatic polyols used in a mixture or alone, both, the polyacids and the polyols being selected among these examples as recited earlier for the preparation of the (meth)acryloyl group containing semi-crystalline polyesters.

Examples of the diamines which can be used, either alone or in combination, for the preparation of the polyesteramides are selected from ethylenediamine, 1,3-propanediamine, 1,5-pentanediamine, 1,6-hexanediamine, 1,2-cyclohexanediamine, 1,3-cyclohexanediamine, 1,4-cyclohexanediamine, 2,2-dimethyl-1,3-propanediamine, N-(2-iaminoethyl)-1,2-ethanediamine, 3,3'-dimethyl-4,4'-diaminodicyclohexylmethane, 4,4'-diaminodicyclohexylmethane, 3,3'-dimethyl-4,4'-diaminodiphenylmethane, 4,4'-diaminodiphenylmethane and analogous compounds.

The polyesteramides used for the preparation of the (meth)acryloyl group containing polyesteramides are prepared accordingly a two or more step procedure process as disclosed in U.S. Pat. No. 5,306,786.

On completion of the synthesis of the carboxylic acid group containing polyesteramide, a substantially equivalent amount of glycidyl(meth)acrylate is added thereto, accordingly a procedure as described above for the preparation of the (meth)acryloyl group containing semi-crystalline polyesters starting from the carboxylic acid group functional polyester, to end up with a (meth)acryloyl group containing polyesteramide characterised by a number average molecular weight (Mn) from 800 to 16 000 and preferably from 1 300 to 8 500, a glass transition temperature (Tg) from 40 to 70° C., a degree of unsaturation ranging from 0.15 to 2.00 and preferably from 0.35 to 1.50 milliequivalents of double bonds per gram of polyesteramide and an ICI cone/plate viscosity of less than 50 000 mPa.s measured at 200° C.

The (meth)acryloyl group containing polyurethanes of the present invention are prepared from the reaction of an hydroxyalkyl(meth)acrylate and a polyol with a polyisocyanate.

The polyol used for the preparation of the (meth)acryloyl group containing polyurethanes are chosen among the C2–C15 aliphatic or cycloaliphatic diols, polyester polyols or polyether polyols.

Examples of C2–C15 aliphatic or cycloaliphatic diols are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-methyl-1,3-propanediol, hydroxypivalate ester of neopentyl glycol, 1,4-cyclohexanediol, 1,4-cyclohexanedimethanol, hydrogenated Bisphenol A, 2,2,4,4-tetramethyl-1,3-cyclobutanediol, 4,8-bis(hydroxymethyl)-tricyclo-[5,2,1,0$^{2,6}$]-decane.

The polyester polyols, characterised by number average molecular weight (Mn) from 8200 to 4000, are prepared from a stoichiometric excess of an aliphatic or cycloaliphatic polyol with an aromatic, aliphatic or cycloaliphatic polyacid, the polyacids and the polyols being selected among those recited earlier for the preparation of the (meth)acryloyl group containing semi-crystalline polyesters or polyesteramides.

Examples of the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed in Encyclopaedia Technology, Vol. 7, pp. 257–262, published by Interscience Publishers, Inc. (1951).

Examples of polyisocyanates that can be used for the preparation of the (meth)acryloyl group containing polyurethanes of the present invention are 1-isocyanato-3,3,5-trimethyl-5-isocyanatomethylcyclohexane (isophorondiisocyanate, IPDI), tetramethylxylenediisocyanate (TMXDI), hexamethylenediisocyanate (HDI), trimethylhexamethylenediisocyanate, 4,4'-diisocyanatodicyclohexylmethane, 4,4'-diisocyanatodiphenylmethane, these technical mixtures with 2,4-di-isocyanatodiphenylmethane and also the higher homologues of above mentioned diisocyanates, 2,4-di-isocyanatotoluene and technical mixtures of them with 2,6-diisocyanatotoluene, as well as the copolymerisation product of α,α'-dimethyl-meta-isopropenylbenzylisocyanate (TMI).

The hydroxyalkyl(meth)acrylate used for the preparation of the (meth)acryloyl group containing polyurethanes are hydroxyalkylesters of acrylic or methacrylic acid preferably having 2 to 4 carbon atoms in the hydroxyalkyl group such as hydroxyethyl(meth)acrylate, 2- and 3-hydroxypropyl (meth)acrylate and 2-, 3- and 4-hydroxybutyl(meth)acrylate.

Preparation of the polyurethanes by reacting the above mentioned starting components may be carried out in inert solvents such as acetone, ethyl acetate, butyl acetate or toluene, preferably at reaction temperatures of 20 to 100° C. The reaction is preferably carried out by reacting the polyisocyanate with the hydroxyalkyl(meth)acrylate in a first reaction step and then reacting the resulting reaction product with the polyol.

The reaction may be accelerated by the use of suitable catalysts such as tin octoate, dibutyltin dilaurate or tertiary amines such as dimethylbenzylamine. The polyurethane or urethane acrylate obtained as the reaction product may be protected against premature, unwanted polymerisation by the addition of suitable inhibitors and antioxidants such as phenols and/or hydroquinones in quantities of 0.001 to 0.300% by weight, based on the polyurethane. These auxiliary agents may be added before, during and/or after the reaction which results in the polyurethane.

The (meth)acryloyl group containing polyurethanes of the present invention are characterised by a number average molecular weight (Mn) from 800 to 15 000 and preferably from 1 300 to 8 500, a glass transition temperature (Tg) from 40 to 100° C., a degree of unsaturation ranging from 0.15 to 0.20 and preferably from 0.35 to 1.50 milliequivalents of double bonds per gram of polyurethane and an ICI cone/plate viscosity of less than 100 000 mPa.s measured at 200° C.

The (meth)acryloyl group containing acrylic copolymers of the powder composition of the present invention are prepared from the reaction of (meth)acryloyl group containing monomers having functional groups with an acrylic copolymer having functional groups being capable of reacting with the functional groups of the (meth)acryloyl group containing monomers.

The acrylic copolymer having reactable functional groups is composed of from 40 to 95% mole of at least one acrylic or methacrylic monomer, from 0 to 60% mole of at least one other ethylenically unsaturated monomer and from 5 to 60% mole of a (meth)acryloyl group containing monomer having functional groups selected from epoxy, carboxyl, hydroxyl or isocyanate groups.

The (meth)acryloyl group containing acrylic copolymer of the powder composition of the present invention is prepared accordingly a two step process.

In a first step the acrylate copolymer is prepared in a conventional polymerisation process, such as polymerisation in bulk, in emulsion, or in solution in an organic solvent, in which a certain portion of functional monomer is copolymerised to obtain a functionalised acrylate copolymer. This functional monomer, which is usually present in amounts of between 5 and 60% mole, is preferably an epoxy—functional monomer, for example on the basis of glycidyl (meth)acrylate. However, acid-functional monomers, for example on the basis of (meth)acrylic acid, hydroxyl-functional monomers, for example on the basis of hydroxyethyl (meth)acrylate, or isocyanate-functional monomers, for example on the basis of TMI (benzene, 1-(1-isocyanato-1-methylethyl)-4-(1-methylethenyl)) or MOI (2-isocyanatoethylmethacrylate) also can be used.

The monomers are copolymerised in the presence of free-radical initiator such as benzoyl peroxide, tert.-butyl peroxide, decanoyl peroxide, azo-bis-isobutyronitrile, and the like, in an amount of from 0.1 to 5% by weight of the monomers. Useful monomers for the preparation of the acrylic copolymer are methyl(meth)acrylate, ethyl(meth) acrylate, propyl(meth)acrylate, n-butyl(meth)acrylate, isobutyl(meth)acrylate, tert.-butyl(meth)acrylate, 2-ethylhexyl(meth)acrylate, stearyl(meth)acrylate, tridecyl(meth) acrylate, cyclohexyl(meth)acrylate, benzyl(meth)acrylate, phenyl(meth)acrylate, dimethylaminoethyl(meth)acrylate, diethylaminoethyl(meth)acrylate, polysiloxane (meth)acrylate and caprolactone(meth)acrylate. These monomers usually are present in amounts between 40 and 95% mole.

Other copolymerisable monomers, which can be present in amounts between 0 and 60% mole, are for example styrene, α-methylstyrene, vinyltoluene, acrylonitrile, methacrylonitril, vinyl acetate, vinyl propionate, acrylamide, methacrylamide, methylolmethacrylamide, vinylchloride, ethylene, propylene and C4–20 α-olefins.

In the second step an addition reaction is carried out between the functionalised monomer of the acrylate copolymer obtained from the first step and the (meth)acryloyl group containing compound that can react with said functional monomer. The compound that can react respectively is for example (meth)acrylic acid, maleic anhydride, (β-methyl)glycidyl(meth)acrylate, allylglycidylether, MOI, hydroxyethyl (meth)acrylate, hydroxybutylvinylether, allylalcohol.

The addition reaction of the second step can be done either in bulk or in solvent. Typical solvents are toluene, xylene, n-butylacetate, etc. The compound containing an (meth)acryloyl group that can react with the functionalised acrylate polymer is added at temperatures between 50 and 150° C. The mixture is stirred for several hours. The progress of the reaction is followed by titration.

The (meth)acryloyl group containing acrylic copolymer of the powder composition of the present invention exhibit following characteristics:
- a number average molecular weight (Mn) from 1000 to 8000 and preferably from 2 000 to 6 000 measured by GPC
- a degree of unsaturation from 0.35 to 3.50 and preferably from 0.5 to 2.5 milliequivalents of double bounds per gram of acrylic copolymer
- an ICI cone/plate melt viscosity of less than 50 000 mPa.s measured at 200° C. according to ASTM D4287
- a glass transition temperature (Tg) from 45 to 100° C. as determined by DSC according to ASTM D3418

Besides, up to 30% weight of the composition of the invention may be constituted of a (meth)acryloyl group containing monomer or oligomer selected from the triacrylate and the tri(meth)acrylate of tris(2-hydroxyethyl)isocyanurate, the epoxy acrylates and methacrylates which are formed by the reaction of an epoxy compound (for example, the diglycidyl ether of Bisphenol A) with acrylic or methacrylic acid, the urethane acrylates and methacrylates which are formed by the reaction of an organic di- or polyisocyanate with an hydroxyalkylacrylate or a hydroxyalkylmethacrylate and optionally a mono- and/or polyhydroxylated alcohol (for example, the reaction product of hydroxyethyl(meth)acrylate with toluenediisocyanate or isophoronediisocyanate), the acrylic acrylates or methacrylates, such as, for example, the reaction product of (meth)acrylic acid with a copolymer containing glycidyl groups and methylmethacrylate, and the like.

The polyphenoxy resin, the semi-crystalline polyester and/or the polyesteramide and/or polyurethane and/or acrylic copolymer optionally along with one or more monomers or oligomers all containing (meth)acryloyl groups all described above, intended to be used as binders in the preparation of powder compositions curable by UV radiation or by accelerated electron beams, it being possible for the said compositions to be used in particular as varnishes and paints which e.g. lend themselves to application according to the technique of deposition by means of a triboelectric or electrostatic spray gun or according to the technique of deposition in a fluidised bed. The radiation curable powder compositions can be used as varnishes or paints as such or, if desired, the compositions can be used to prepare the varnishes or paints by adding, further constituents conventionally used in the preparation of powder varnishes and paints.

Therefore, the present invention also relates to the powder varnish or paint obtained using these compositions.

Finally, the present invention also relates to a process for coating an article more particularly a metal article comprising the application to the said article of a radiation curable powder composition in accordance with the invention by deposition such as by spraying with a triboelectric or electrostatic spray gun or by deposition in a fluidised bed, followed by the melting of the coating thus obtained such as by heating at a temperature of 80 to 150° C. for a time of e.g. approximately 0.5 to 10 minutes and by the curing of the coating in the molten state by UV irradiation or by accelerated electron beams.

For the radiation curing of the powder compositions in accordance with the invention with accelerated electron beams, it is not necessary to use a photo-initiator, seeing that this type of radiation provides by itself alone a production of free radicals which is sufficiently high for the curing to be extremely rapid. In contrast, when it concerns the photo-curing of the powder composition according to the invention with radiation where the wavelengths are between 200 and 600 nm (UV radiation), the presence of at least one photo-initiator is essential.

The photo-initiators which can be used according to the present invention are chosen from those commonly used for this purpose.

The appropriate photo-initiators which can be used, are aromatic carbonyl compounds, such as benzophenone and its alkylated or halogenated derivatives, anthraquinone and its derivatives, thioxanthone and its derivatives, benzoin ethers, aromatic or non-aromatic alphadiones, benzil dialkyl acetals, acetophenone derivatives and phosphine oxides.

Photo-initiators which may suitable, are, for example, 2,2'-diethoxylacetophenone, 2-,3- or 4-bromoacetophenone, 2,3-pentanedione, hydroxycyclohexylphenylketone, benzaldehyde, benzoin, benzophenone, 9,10-dibromoanthracene, 2-hydroxy-2-methyl-1-phenylpropan-1-one, 4,4'-dichlorobenzophenone, xanthone, thioxanthone, benzildimethylketal, diphenyl(2,4,6-trimethylbenzyl)phosphine oxide, and the like. It may be optionally advantageous to use a photo-activator, such as tributylamine, 2-(2-aminoethylamino)ethanol, cyclohexylanine, diphenylamine, tribenzylamine or aminoacrylates such as, for example, the addition product of a secondary amine, such as dimethylamine, diethylamine, diethanolamine, and the like, with a polyol polyacrylate, such as the diacrylate of trimethylolpropane, 1,6-hexanediol, and the like. The powder compositions in accordance with the invention can contain 0 to 15 and preferably 0.5 to 8.0 parts of photo-initiators for 100 parts by weight of the binder in the composition in accordance with the invention.

The radiation curable powder compositions and powder varnishes or paints, respectively, in accordance with the invention can also contain various additional substances conventionally used in the manufacture of powder paints and varnishes. The additional substances optionally added to the radiation-curable powder compositions in accordance with the invention, e.g. to prepare the powder varnishes or paints are, inter alia, compounds which absorb UV radiation, such as Tinuvin 900 (Ciba), light stabilisers based on sterically hindered amines (for example Tinuvin 144 from Ciba), fluidity-regulating agents such as Resiflow PV5 (Worlee), Modaflow (Monsanto), Acronal 4F (BASF) or Crylcoat 109 (UCB), degassing agents such as benzoin and the like.

To the radiation-curable powder composition according to the present invention, further can be added a variety of coating properties modifying substances such as polytetrafluoroethylene modified polyethylene waxes (e.g. Lanco Wax TF 1830 from Lubrizol), polyethylene waxes (e.g. Ceraflour 961 from BYK Chemie), polypropylene waxes (e.g. Lanco Wax PP1362 from Lubrizol), polyamide waxes (e.g. Orgasol 3202 D NAT from ELF Atochem), organosilicones (e.g. Modarez S304P from Protex), etc., or blends of them. These modifying substances are optionally added from 0 to 10 parts for 100 parts by weight of the binder in the composition according to the invention. A variety of pigments and inorganic fillers can also be added to the radiation curable powder compositions in accordance with the invention. Mention will be made, as examples of pigments and fillers, of metal oxides, such as titanium oxide, iron oxide, zinc oxide, and the like, metal hydroxides, metal powders, sulphides, sulphates, carbonates, silicates such as, for example, aluminium silicate, carbon black, talc, kaolins, barytes, iron blues, lead blues, organic reds, organic maroons, and the like.

These additional substances are used in the usual amounts, it being understood that if the radiation curable powder compositions in accordance with the present invention are used as varnishes, the addition of additional substances having opacifying properties should be omitted.

For the preparation of the radiation curable powder compositions of the present invention the polyphenoxy resin, the semi-crystalline polyester and/or the polyesteramide and/or polyurethane and/or acrylic copolymer optionally along with one or more monomer or oligomer all containing (meth)acryloyl groups, optionally the photo-initiator, optionally the various additional substances conventionally used for the manufacturing of powder paints and varnishes, and optionally the coating properties modifying substances are dry mixed, for example in a tumbler mixer. The mixture is then homogenised at a temperature ranging from 60 to 150° C. in an extruder, for example in a Buss Ko-Kneter single screw extruder or a twin screw extruder of Werner-Pfleiderer, APV-Baker or Prism type. The extrudate is then allowed to cool, is ground and sieved in order to obtain a powder in which the size of the particles is preferably between 10 and 150 μm.

Instead of the above methods, it is also possible to dissolve/suspend the different unsaturated constituents of the binder system of the present invention, optionally the photo-initiator, and the various additional substances in a solvent such as dichloromethane, to grind in order to obtain a homogeneous suspension containing approximately 30% by weight of solid matter and subsequently to evaporate the solvent, for example by spray drying at a temperature of approximately 50° C., according to methods known per se.

The powder paints and varnishes thus obtained, are entirely suitable for application to the article to be coated by conventional techniques, that is to say by the well-known technique of e.g. deposition in a fluidised bed or by application with a triboelectric or electrostatic spray gun.

After having been applied to the article concerned, the coatings deposited are heated e.g. in a forced circulation oven or by means of infrared lamps at a temperature of 80 to 150° C. for a time of e.g. approximately 0.5 to 10 minutes for the purpose of obtaining the melting and the spreading of the powder particles as a smooth, uniform and continuous coating at the surface of the said article. The molten coating is then cured by radiation, such as UV light emitted, for example, by medium pressure mercury vapour UV radiators, of preferably at least 80 to 250 W/linear cm, or by any other well-known source of the state of the art, at a distance of e.g. approximately 5 to 20 cm and for a time sufficient to cure the coating, such as 1 to 60 seconds.

The molten coating can also be cured with accelerated electron beams of preferably at least 150 keV, the power of the devices employed being a direct function of the thickness of the composition layer to be cured by polymerisation.

The invention is also concerned by articles partially or entirely coated by the coating processes.

The radiation curable powder compositions in accordance with the invention can be applied to the most diverse substrates, such as, for example, metal, paper, cardboard, wood, fibre board, textiles, plastics, such as polycarbonates, poly(meth)acrylates, polyolefins, polystyrenes, poly(vinylchloride)s, polyesters, polyurethanes, polyamides, copolymers such as acrylonitrile-butadiene-styrene (ABS) or cellulose acetate butyrate, and the like.

The radiation curable powder compositions in accordance with the invention can also be formulated in toner compositions.

The examples which follow, illustrate the invention without limiting it. Except when otherwise indicated, the parts mentioned throughout the description and in the examples are parts by weight.

EXAMPLE 1

Synthesis of a Semi-Crystalline Polyester Containing End Methacryloyl Groups in Three Steps 1st Step 258.4 parts of 1,6-hexanediol, 10.4 parts of trimethylolpropane and 1.9 parts of n-butyltin trioctoate, as catalyst, are introduced into a four-necked round-bottomed flask equipped with a stirrer, a distillation column connected to a water-cooled condenser, a nitrogen inlet pipe and a thermometer connected to a thermoregulator. The mixture is heated in a nitrogen atmosphere and with stirring to a temperature of approximately 140° C., 484.4 parts of terephthalic acid are then added, still with stirring, and the mixture is heated to a temperature of 190° C., at which the water formed begins to distil. The heating in then continued gradually until the mass reaches a temperature of 230° C. After approximately 95% of the theoretical amount of water formed has been collected, a transparent polyester is obtained.

The semi-crystalline polyester containing end hydroxyl groups thus obtained exhibits the following characteristics:
AN=9.5 mg KOH/g
OHN=42 mg KOH/g
ICI175° C.=700 mPa.s 2nd Step The polyester containing end hydroxyl groups obtained in the first step is allowed to cool to 200° C. and 75 parts of isophthalic acid are added thereto. The reaction mixture is then gradually heated to the temperature of 230° C. The reaction mixture is left at this temperature for approximately two hours, until the reaction mixture becomes transparent, and the pressure is then gradually decreased for three hours at 230° C. under reduced pressure.

The semi-crystalline polyester containing end carboxyl groups thus obtained exhibits the following characteristics:
AN=31 mg KOH/g
OHN=1 mg KOH/g
ICI175° C.=7 450 mPa.s
Mn (GPC)=4 550

3rd Step

The polyester containing end carboxyl groups obtained in the second step is allowed to cool to 150° C., and 0.4 part of di-t-butylhydroquinone, as polymerisation inhibitor, and 4.1 parts of ethyltriphenylphosphonium, as catalyst, are added thereto. 62.2 parts of glycidylmethacrylate are the added thereto slowly in an oxygen atmosphere and with stirring. One hour after the addition has been completed, a semi-crystalline polyester containing end methacryloyl groups is obtained which exhibits the following characteristics:

AN=1.5 mg KOH/g
OHN=32 mg KOH/g
unsaturation=0.5 meq/g
ICI175° C.=5 300 mPa.s
Tm(quenched—DSC, 20°/min)=101° C.
Mn (GPC)=4 890

EXAMPLE 2

221.3 parts of n-butylacetate are brought in a double walled flask of 5 l equipped with a stirrer, a water cooled condenser an inlet for nitrogen and a thermoprobe is attached to a thermoregulator.

The flask content is heated and stirred continuously while nitrogen is purged through the solvent. At a temperature of 110° C. a mixture of 234.7 parts of n-butylacetate with 13.4 parts of 2,2'-azobis(2-methylbutanenitrile) is fed in the flask during 215 minutes with a peristaltic pump. Five minutes after the start of this feed, a second feed is started with another pump and is a mixture of:

102.7 parts of hydroxyethylmethacrylate
88.5 parts of isobornylacrylate
162.9 parts of methylmethacrylate
88.5 parts of n-butylmethacrylate This feed takes 180 minutes.

The acrylic copolymer having hydroxyl functional groups and characterised by:

OHN=96 mg KOH/g
ICI125° C.=22 500 mPa.s
Tg (quenched—DSC, 20°/min)=53° C.

then is transversed as a solution in a round bottom single walled flask.

The solution is heated to 40° C. and air is continuously purged through. After 30 minutes 0.09 parts of Norsocryl 200 (inhibitor commercialised by Elf Atochem) and 87.6 parts of 2-isocyanotoethylmethacrylate are added in 180 minutes. The isocyanate number is checked regularly through back-titration of dibutylamine with hydrochloric acid. When the isocyanate content is less than 0.3% of the initial value the flask content is cooled down and dried in a rotary evaporator at 30° C.

The ethylenically unsaturated acrylic copolymer thus prepared is characterised by following characteristics:

unsaturation=1.45 meq/g
ICI100° C.=50 000 mPa.s
Tg (quenched—DSC, 20'/min)=51° C.
Mn (GPC)=3125

EXAMPLE 3

In a conventional four-neck round bottom flask equipped with a stirrer, an inlet for oxygen, an inlet for (meth)acrylic acid and a thermocouple attached to a thermoregulator, 910 parts of Araldite GT7004, a Bisphenol A-type epoxy resin, are heated under oxygen to a temperature of 140° C. Subsequently 0.8 parts of ethyltriphenylphosphonium bromide are added and the addition of 90 parts of acrylic acid containing 0.2 parts of di-t-butylhydroquinone, is started. The acrylic acid addition is completed in a 3 hour period. One and an half hour after the completion of the acrylic acid addition, a resin with the following characteristics is obtained:

AN=7 mg KOH/g
unsaturation=1.24 meq/g
ICI200° C.=700 mPa.s
Tg (quenched—DSC, 20°/min)=49° C.
Mn (GPC)=1650

EXAMPLE 4 AND 5

Two white powders which can be used for the manufacturing of coatings by spraying with the aid of an electrostatic spray gun are prepared from blends of the methacryloyl group containing resins of example 1 and 2 respectively, with the methacryloyl group containing polyphenoxy resin of example 3, the formulation of these powders being as follows:

| White powder formulation | 750.0 parts |
|---|---|
| binder | |
| titanium dioxide (Kronos 2310 (Kronos)) | 250.0 parts |
| α-hydroxyketone (Irgacure 2959 (Ciba)) | 12.5 parts |
| bisacylphosphineoxide (Irgacure 819 (Ciba)) | 12.5 parts |
| fluidity regulating agent (Resiflow PV5 (Worlee Chemie)) | 10.0 parts |

These powder compositions are prepared by dry mixing the different ingredients. The mixture obtained is homogenised at a temperature of approximately 70 to 140° C. in a Prism 16 mm (L/D=15/1) twin screw extruder (from the company Prism), and the extrudate is ground in a grinder of Alpine 100UPZ (from the company Alpine). To complete, the powder is sieved in order to obtain a size of the particles between 10 and 110 μm.

The powders thus obtained respectively comprise a binder system composed of:

| Example 4 | | Example 5 | |
|---|---|---|---|
| Example 1: | 563 parts | Example 2: | 375 parts |
| Example 3: | 187 parts | Example 3: | 375 parts |

EXAMPLE 6

Characteristics of the Coating

The powders formulated as described in example 4 and 5 are applied with an electrostatic spray gun at a voltage of 60 kV on untreated cold rolled steel with a film thickness of 40 to 100 μm.

The coatings deposited are then subjected to melting in a medium infrared/convection oven (Triab) at a temperature of 140° C. during a time of approximately 3 minutes, and are then subjected to irradiation with ultraviolet light emitted by a 160 W/cm Gallium-doped followed by a 160 W/cm medium pressure mercury vapour UV-bulb (Fusion UV Systems Ltd.) with a total UV dose of 4000 mJ/cm$^2$.

The powder coatings obtained were tested; following results are perceived:

visual assessment: Example 4=good, Example 5=good.
  For both powders a smooth and glossy appearance without any defect was perceived.
MEK resistance: Example 4>200 double rubs, Example 5>200 double rubs, which corresponds to the number of twofold rubbing movements (to and fro) with a cotton pad impregnated with MEK which does not detrimentally affect the appearance of the surface of the cured film.

Reverse impact: Example 4=160 kg.cm, Example 5=60 kg.cm, the value of resistance to reverse impact (RI) in kg.cm, according to ASTM D2795 on cold rolled steel.

Direct impact: Example 4=160 kg.cm, Example 5=80 kg.cm, the value of resistance to direct impact (DI) in kg.cm, according to ASTM D2795 on cold rolled steel.

While the invention has been described in detail and with reference to specific embodiments thereof, it will be apparent to one of ordinary skill in the art that various changes and modifications can be made therein without departing from the spirit and scope thereof.

The invention claimed is:

1. Radiation curable powder coating composition which comprises
    a) 10 to 90% weight of a (meth)acryloyl group containing polyphenoxy resin having a number averaged molecular weight ranging from 650 to 3500,
    b) 10 to 90% weight of a (meth)acryloyl group containing resin, different from the (meth)acryloyl group containing polyphenoxy resin a) and from a (meth)acryloyl group containing amorphous polyester and wherein the (meth)acryloyl group containing resin b) is selected from (meth)acryloyl group containing polyesteramides and/or polyurethanes and/or acrylic copolymers; and
    c) 0 to 30% weight of a (meth)acryloyl group containing monomer or oligomer.

2. Radiation curable powder composition according to claim 1 wherein the (meth)acryloyl group containing polyphenoxy resin a) is the reaction product of (meth)acrylic acid with a glycidyl group containing polyphenoxy resin.

3. Radiation curable powder composition according to claim 1 wherein the (meth)acryloyl group containing polyphenoxy resin a) has at least one of following properties:
    a glass transition temperature ranging from 30 to 80° C.
    a degree of unsaturation ranging from 0.2 to 6.0 milliequivalents of double bonds per gram of (meth) acryloyl group containing polyphenoxy resin
    a melt viscosity (cone/plate at 200° C.) of less than 20,000 mPa.s.

4. Radiation curable powder composition according to claim 3 wherein the degree of unsaturation ranges from 0.5 to 4.5 milliequivalents of double bonds per gram of (meth) acryloyl group containing polyphenoxy resin.

5. Radiation curable powder composition according to claim 1 wherein the (meth)acryloyl group containing polyesteramide is obtained from the reaction of glycidyl(meth) acrylate with a carboxyl ic acid group terminated polyesteramide.

6. Radiation curable powder composition according to claim 1 wherein the carboxylic acid group terminated polyesteramide used for the preparation of the (meth)acryloyl group terminated polyesteramide is obtained from the reaction of a diamine with a carboxylic acid group containing polyester, the polyester being prepared from the reaction of one or more aliphatic, cycloaliphatic or aromatic polyacids with one or more aliphatic or cycloaliphatic polyols.

7. Radiation curable powder composition according to claim 1 wherein the (meth)acryloyl group containing polyesteramide has at least one of following properties:
    a number averaged molecular weight ranging from 800–16,000,
    degree of terminal unsaturation 0.15 to 2.00 milliequivalents of double bonds per gram of polyester
    a glass transition temperature ranging from 40 to 70° C.
    a melt viscosity (cone/plate at 200° C.) of less than 50,000 mPa.s.

8. Radiation curable powder composition according to claim 7 wherein the degree of terminal unsaturation is 0.35 to 1.50 milliequivalents of double bonds per gram of polyester.

9. Radiation curable powder composition according to claim 7 wherein the number averaged molecular weight ranges from 1,300 to 8,500.

10. Radiation curable powder composition according to claim 1 wherein the (meth)acryloyl group containing polyurethane is obtained from the reaction of an hydroxyalkyl (meth)acrylate and a poiyoi with a polyisocyanate.

11. Radiation curable powder composition according to claim 1 wherein the polyol used for the preparation of the (meth)acryloyl group containing polyurethane is a C2–C15 aliphatic or cycloaliphatic diol, a polyesterpolyol or a polyetherpolyol.

12. Radiation curable powder composition according to claim 1 wherein the (meth)acryloyl group containing polyurethane has at least one of following properties:
    a number averaged molecular weight ranging from 800–15,000,
    degree of terminal unsaturation ranging from 0.15 to 2.00 milliequivalents of double bonds per gram of polyester
    a glass transition temperature ranging from 40 to 100° C.
    a melt viscosity (cone/plate at 200° C.) of less than 100,000 mPa.s.

13. Radiation curable powder composition according to claim 12 wherein the number averaged molecular weight ranges from 1,300 to 8,500.

14. Radiation curable powder composition according to claim 12 wherein the degree of terminal unsaturation ranges from 0.35 to 1.50 milliequivalents of double bonds per gram of polyester.

15. Radiation curable powder composition according to claim 1 wherein the (meth)acryloyl group containing acrylic copolymer is obtained from the reaction of: an acrylic copolymer having functional groups obtained from 40 to 95 mole percentage of at least one monomer having acrylic or methacrylic groups, 0 to 60 mole percentage of another ethylenically unsaturated monomer and 5 to 60 mole percentage of an ethylenically unsaturated monomer having functional groups capable of reacting with an epoxy, carboxylic acid, hydroxyl isocyanate group,
    said monomer having a (meth)acryloyl group and a functional group capable of reacting with a carboxylic acid, epoxy, isocyanate or hydroxyl group.

16. Radiation curable powder composition according to claim 1 wherein the (meth)acryloyl group containing acrylic copolymer has at least one of following properties:
    a number averaged molecular weight ranging from 1,000 to 8,000,
    a glass transition temperature ranging from 45 to 100° C.
    a degree of unsaturation ranging from 0.35 to 3.50 milliequivalents of double bonds per gram of acrylic copolymer
    a melt viscosity (cone/plate at 200°C.) of less than 50,000 mPa.s.

17. Radiation curable powder composition according to claim 16 wherein the degree of unsaturation is 0.5 to 2.5 milliequivalents of double bonds per gram of polyester.

18. Radiation curable powder composition according to claim 16 wherein the number averaged molecular weight ranges from 2,000 to 6,000.

19. Radiation curable powder composition according to claim 1, which additionally comprises up to 15 parts by weight of a photoinitiator for 100 parts by weight of the total of the (meth)acryloyl group containing polyphenoxy and the (meth)acryloyl group containing polyesteramide and/or the (meth)acryloyl group containing polyurethane and/or the (meth)acryloyl group containing acrylic copolymer and/or the (meth)acryloyl group containing monomer or oligomer, if present, and optionally a photo-activator.

20. Radiation curable powder composition according to claim 19 wherein 0.5 to 8.0 parts by weight of photoinitiator for 100 parts by weight of the total of the (meth)acryloyl group containing polyphenoxy and the (meth)acryloyl group containing polyesteramide and/or the (meth)acryloyl group containing polyurethane and/or the (meth)acryloyl group containing acrylic copolymer and/or the (meth)acryloyl group containing monomer or oligomer, if present, and optionally a photo-activator, is employed.

21. Powder varnish or powder paint comprising a radiation curable powder composition according to claim 1.

22. Process for coating an article wherein a radiation curable powder composition according to claim 1 or a powder varnish or a powder paint containing said composition is deposited on the article, followed by melting the coating thus obtained and by radiation curing the coating in the molten state.

23. Process according to claim 22 wherein the melting of the coating is achieved by heating the coating at a temperature of 80 to 150° C. and/or the curing of the coating in the molten state is achieved by exposing the said coating to UV radiation or to accelerated electron beams for a time which is sufficient to form a cured coating.

24. Process according to claim 23 wherein said time is from 0.5 to 10.0 minutes.

25. Article partially or entirely coated by the process of claim 22.

* * * * *